Sept. 4, 1951    S. PATT    2,566,628
DOUGH FORMING MACHINE
Filed June 23, 1948    2 Sheets-Sheet 2
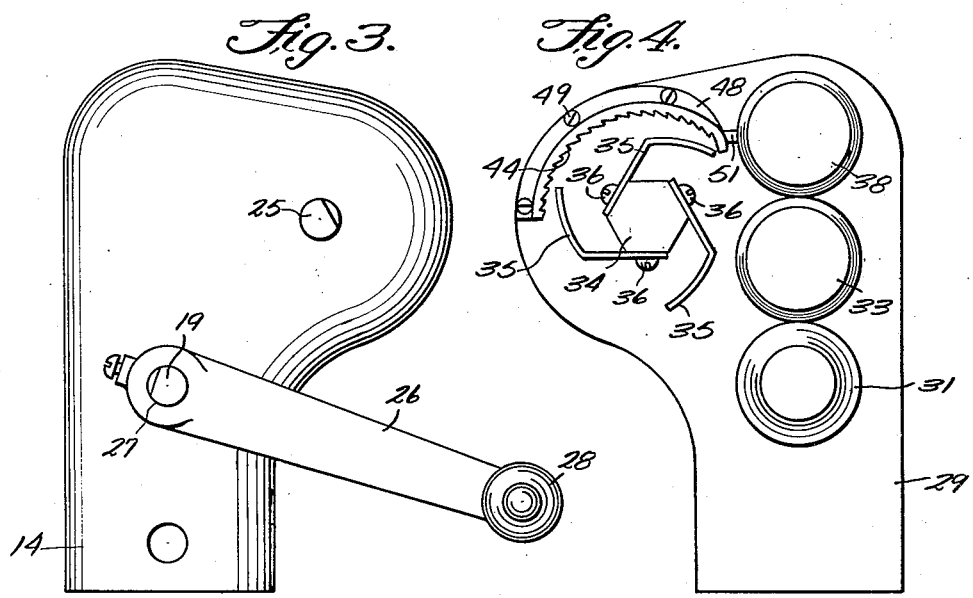
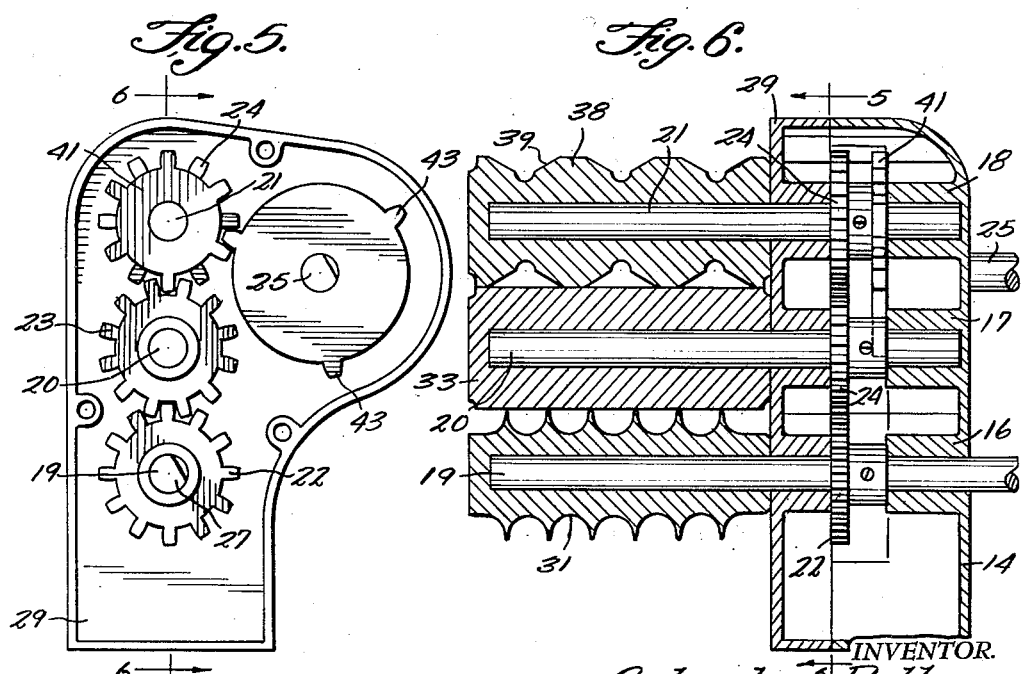
INVENTOR.
Sylvester Patt,
BY Victor J. Evans & Co.
ATTORNEYS Patented Sept. 4, 1951

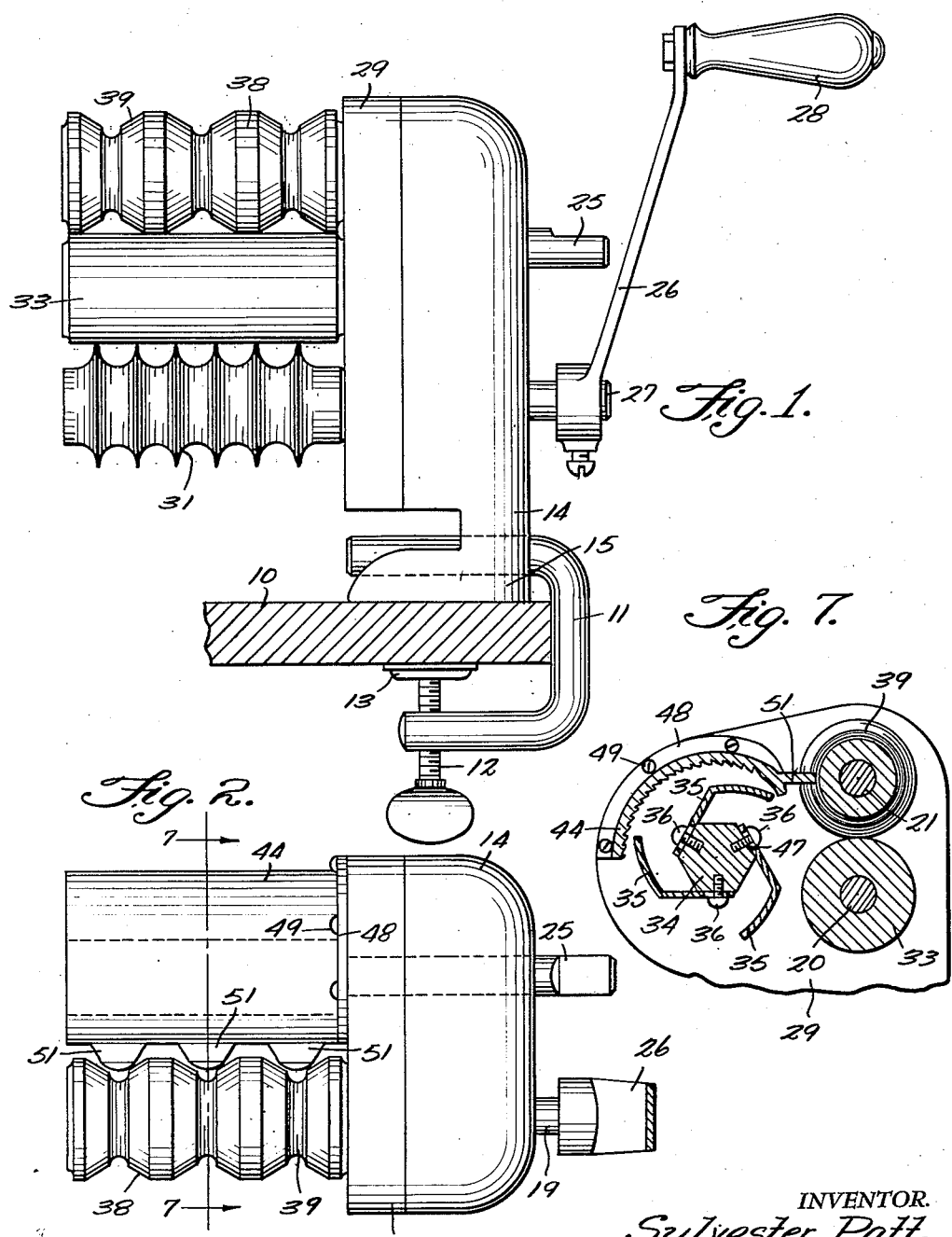

2,566,628

UNITED STATES PATENT OFFICE 2,566,628

DOUGH FORMING MACHINE

Sylvester Patt, Willoughby, Ohio

Application June 23, 1948, Serial No. 34,691

1 Claim. (Cl. 107—9)

This invention relates to dough forming machines.

It is an object of the present invention to provide a dough forming machine which will form dough into a shell-like product wherein all the operations necessary to form the dough can be done on the same machine and wherein the paddles which are utilized for bringing the dough into the cradle are adjustable so that the same can be adjusted in case of wear to insure the piece of dough being cut clean and wherein the roller for extending the dough into the cradle is operated at the proper interval for the paddles to be picked up and through a timing gear connection.

Other objects of the preesnt invention are to provide a dough forming machine adapted to form dough into a shell-like product, which is of simple construction, easy to operate and efficient in operation.

For other objects and for a better understanding of the invention, reference may be had to the following detailed description taken in connection with the accompanying drawing, in which Fig. 1 is a front elevational view of the dough forming machine embodying the features of the present invention.

Fig. 2 is a top plan view.

Fig. 3 is an end elevational view with the crank in place on one of the shafts.

Fig. 4 is an end elevational view of the machine looking upon the end of the same opposite from the end at which the crank is located.

Fig. 5 is an elevational view, in section, taken on line 5—5 of Fig. 6.

Fig. 6 is a longitudinal sectional view taken on line 6—6 of Fig. 5.

Fig. 7 is a transverse sectional view taken on line 7—7 of Fig. 2.

Referring now to the figures, 10 represents a table top over which may be extended a clamp 11 having a thumb screw 12 with a plate 13 thereon adapted to be brought up against the under side of the table top 10. The clamp 11 has a bent end adapted to be extended through a casing 14 and upon a base 15 thereof for retaining the base flush with the top of the table 10. The casing 14 has a plurality of vertically aligned bearings 16, 17 and 18 receiving roller shafts 19, 20 and 21 respectively having respectively gears 22, 23 and 24 meshing together with one another. Laterally spaced from the vertically aligned shafts is a shaft 25 adapted to receive crank 26. The shaft 19 has an extension 27 also adapted to receive the crank 26 and on which the crank is disposed as shown in Fig. 3. The crank has a handle 28.

Connected to the casing 14 is a separable casing part 29 through which the shafts 19, 20 and 21 extend.

Fixed to the shaft 19 is a roller having half round grooves 31 adapted to cooperate with a smooth roller 33. These rollers are used for cutting the dough into strips when the shaft 19 is turned by the crank 26.

After the strips are cut, the crank handle 26 is placed upon shaft 25 having a multi-side portion or body member 34 to which paddles 35 are connected 120 degrees apart. These paddles are secured by screws 36. The cut strips of dough will be fed between rollers 33 and 38 having beveled grooves 39. A timing gear 41 is connected to shaft 21 which is operated by a timing gear 42 having geared teeth 43 spaced 120 degrees apart. By turning the paddles 35 clockwise, the timing gear will index the upper roller 38 to feed strips of dough to cradle 44 before the paddle reaches the point where the dough piece is cut off. As the dough piece is cut off, the cut piece is squeezed against the cradle having serrations and the paddle, upon continuing its movement, will flatten a piece of dough and automatically as the dough is dropped it curls to form a shell. A slot 47 is provided in each paddle through which the attaching screw 36 extends whereby the paddle can be adjusted to the proper location on the hexagonal portion 34.

The shell 44 has a flange 48 with openings through which screws 49 extend to secure the shell or cradle 44 to the casing part 29. On the cradle are projections 51 which extend into grooves 39 of the roller 38 to clean the dough from the grooves.

While various changes may be made in the detail construction, it shall be understood that such changes shall be within the spirit and scope of the present invention.

I claim:

In a dough-forming machine, a casing, a casing part arranged adjacent to said casing and connected thereto, a body member rotatably supported by said casing and provided with a plurality of flat, longitudinally extending faces, a plurality of paddles each having a substantially L-shape provided with a portion arranged contiguous to each of said faces, there being a slot arranged in each of said paddles, a securing element extending through said slot and into said body member, and an arcuate cradle for coaction with said paddles connected to said casing part and provided with a plurality of serrations on its inner surface.

SYLVESTER PATT.

REFERENCES CITED

The following references are of record in the file of this patent:

UNITED STATES PATENTS

| Number | Name | Date |
|---|---|---|
| 1,332,435 | DeVito | Mar. 2, 1920 |
| 1,424,806 | DeVito | Aug. 8, 1922 |
| 1,884,218 | Quattrocchi | Oct. 25, 1932 |
| 1,939,362 | Patt | Dec. 12, 1933 |
| 2,259,943 | Tanzi | Oct. 21, 1941 |